Feb. 15, 1955   B. ROENSCH   2,701,904
APPARATUS FOR MAKING BUILDING PANELS
Original Filed May 1, 1947   4 Sheets-Sheet 2

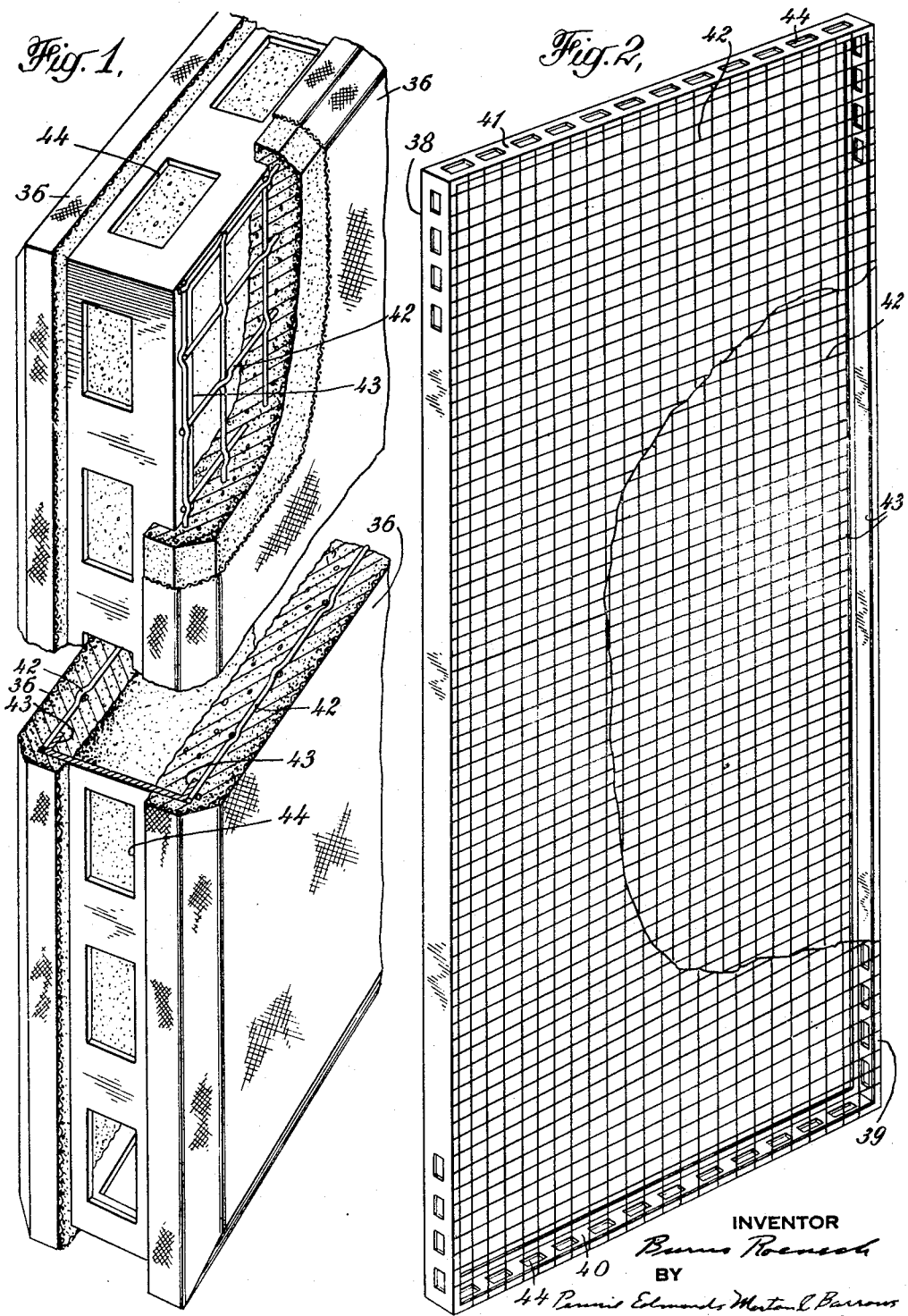

INVENTOR
Burns Roensch
BY
Pennie Edmonds, Morton & Barrows
ATTORNEYS

Feb. 15, 1955   B. ROENSCH   2,701,904
APPARATUS FOR MAKING BUILDING PANELS
Original Filed May 1, 1947   4 Sheets-Sheet 3
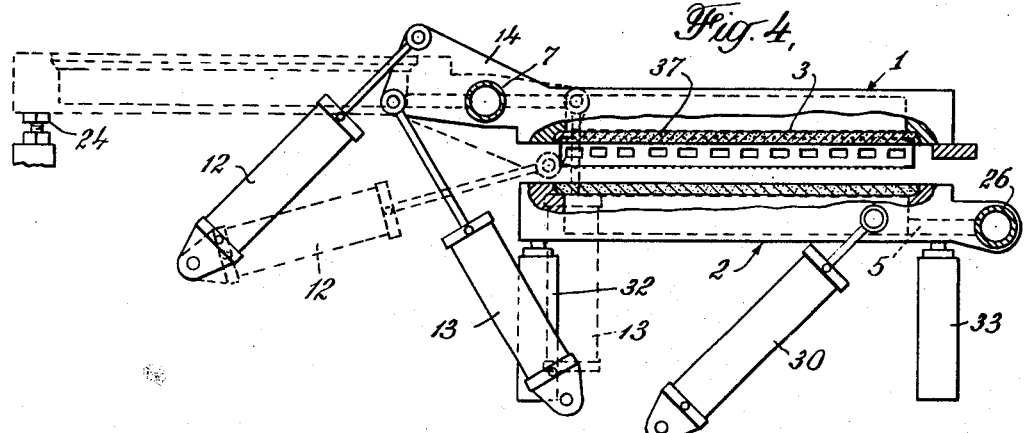
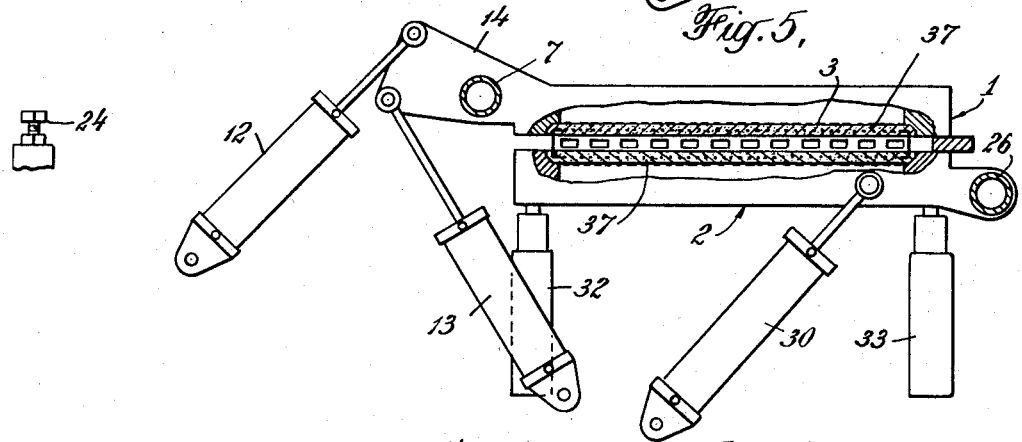
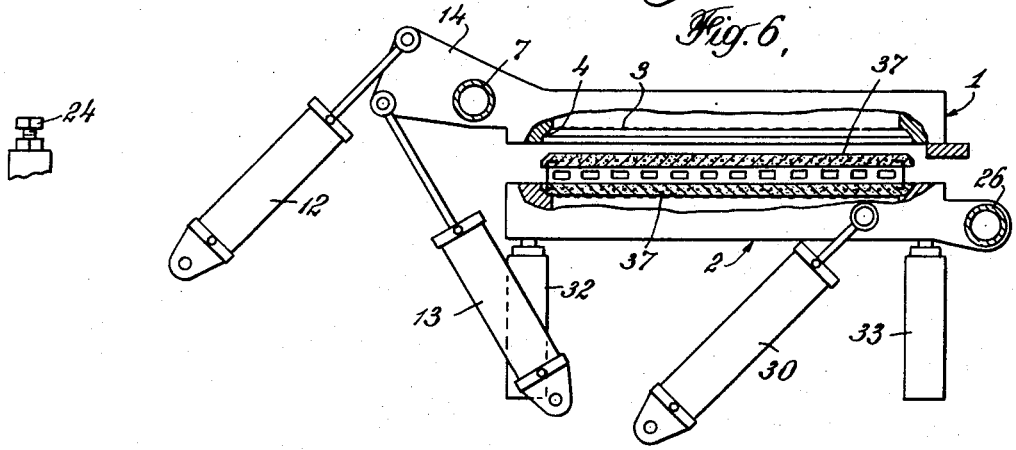
INVENTOR
Burns Roensch
BY
Pennie Edmonds Morton & Barrows
ATTORNEYS 2,701,904
Patented Feb. 15, 1955

UNITED STATES PATENT OFFICE

2,701,904

APPARATUS FOR MAKING BUILDING PANELS

Burns Roensch, Houston, Tex., assignor, by mesne assignments, to Daystrom, Incorporated, a corporation of New Jersey Original application May 1, 1947, Serial No. 745,332. Divided and this application February 9, 1949, Serial No. 75,416

7 Claims. (Cl. 25—41)

This application is a division of copending application Serial No. 745,332 filed May 1, 1947, now Patent 2,655,710 by myself and Paul Brown.

This invention relates to the manufacture of reinforced concrete building panels and more particularly to improvements in the apparatus for making reinforced concrete panels.

The improved building panel may be regarded as a precast molded product. This invention may be utilized in making reinforced building panels of all sizes but in describing typical embodiments of my invention, I will describe an application of this invention to the manufacture of large precast panels having over-all dimensions of approximately 4 feet by 10 feet with a thickness of 4 to 8 inches, the complete panel being preferably a hollow wall structure comprising two reinforced slabs of concrete joined by metal reinforcing members embedded in each slab.

In the manufacture of large precast building panels, it is essential to have not only adequate strength in the panel structure but also a smooth, durable, hard surface free from unsightly cracks and blemishes.

In the manufacture of precast building panels it has been proposed heretofore to employ suction or vacuum molds and to pour the concrete into these molds, whereupon a high vacuum is applied to the concrete through a fine filter screen whereby excess water is removed from the concrete. This vacuum treatment draws some of the fine particles of cement to the filter screen and this cement frequently adheres to the screen with such tenacity that when the molded slab is separated from the screen, patches of cement adhere to the screen with the result that the finished slab has unsightly spots or areas which have to be retouched by manual operations.

After repeated experiments with this method of producing precast slabs, it was discovered that the difficulties encountered in separating the slab from the vacuum mold were due in large measure to the high density of the fine layer of cement formed at the surface adjacent the filter screen. It was found that these difficulties could be surmounted by diluting this surface layer of fine cement, and the best method of accomplishing this result was found to be the use of a fabric, preferably a woven fabric, such as cheesecloth or the like. By placing this fabric in the mold adjacent the suction surface or surfaces thereof, prior to pouring the concrete in the mold, it was found that the subsequent vacuum treatment caused fine particles of cement to form a surface layer adjacent the filter screen with the fabric permanently embedded in this layer of fine cement. The fabric thus became a permanent part of the cast panel and it served the purpose of diluting the fine cement layer to an extent such that it would not adhere to the filter screen. It was thus found to be possible to form slabs of large dimensions having a perfect surface free from blemishes. It was also found that the fabric embedded in the surface of the slab eliminated the tendency for the surface layer to crack or craze.

It has also been proposed heretofore to form precast concrete panels by placing a sheet of any suitable liner material in the bottom of a mold and then pouring concrete into the mold and allowing the concrete to set before removing the slab from the mold. In making panels in this manner, several hours must elapse before the slab can be removed from the mold and the surface liner is not an integral part of the slab as is the case where a vacuum treatment is applied as in my invention which results in the fabric being completely and permanently embedded in the surface of the slab. By employing my invention it is possible to remove the panel from the mold within a few minutes after the concrete is poured and as explained above, the use of a fabric adjacent the filter screen of the vacuum mold, prevents sticking of the concrete to the mold when the slab is removed.

In general, one embodiment of the improved process involves placing a sheet of fabric over the filter screen of a suction mold, pouring a wet mixture of cement and aggregate into the mold in contact with the fabric lining the bottom of the mold, applying a vacuum through the bottom of the mold to withdraw surface water through the fabric and through the filter screen while the top surface of the concrete is exposed to the atmosphere, this vacuum treatment being continued until the concrete forms a coherent solid panel, and then removing the panel from the mold. The total time required for making a single wall panel need not be greater than ten to fifteen minutes because within this time all excess water has been removed from the panel and it is hard enough to handle without danger of injuring any portion of the concrete slab. After removing the slab from the mold, it may be placed on a suitable support and allowed to stand for several hours to permit the concrete to harden.

In removing the panel from the mold, I prefer to turn the mold through an angle of approximately 90° until the panel is in upright position, this operation being performed while continuing the vacuum treatment. The vacuum treatment can then be discontinued and the panel lifted away from the upright mold. In some instances it is preferable to invert the mold by turning it through an angle of 180° while continuing the vacuum treatment. The mold is then lifted from the panel after shutting off the vacuum.

In making a double wall panel according to my improved process, two complementary molds are employed. Concrete is first poured into one mold preferably containing a liner sheet of fabric. A unitary metal cage reinforcing structure is inserted in the mold until a portion of this structure is embedded in the soft concrete, the vacuum is applied to withdraw water from the mass of concrete until it forms a coherent mass with the metal cage partially embedded therein, and then concrete is poured into the second mold and the first mold inverted over the second mold. The two molds are then brought close together so that the metal reinforcing structure partially embedded in the slab formed in the first mold is forced into the soft concrete mass in the second mold, and then, with the two mold sections thus superimposed, vacuum is applied to the second mold to form the concrete poured therein into a coherent mass. The first mold can then be lifted and turned back to its initial position, and then the second mold can be raised to a vertical position, or inverted, to facilitate removal of the completed double wall slab from the second mold.

The various objects and advantages of my invention will be more apparent from the following detailed description of typical embodiments thereof illustrated in the accompanying drawings in which:

Fig. 1 is a perspective view partly in section showing a finished double wall building panel made in accordance with my invention;

Fig. 2 is a perspective view of a form of unitary metal reinforcing cage suitable for use in making the panel of Fig. 1;

Figure 3:
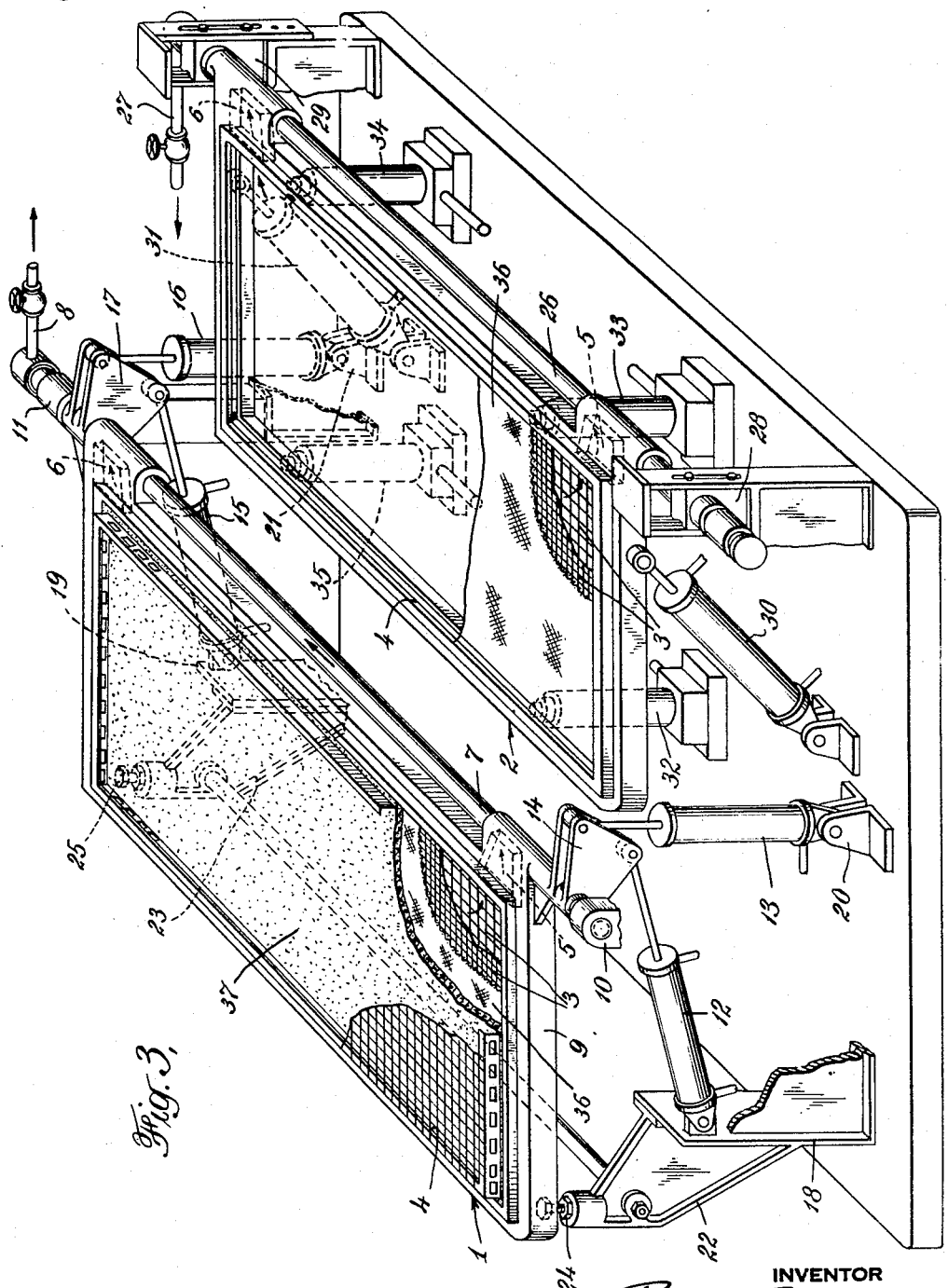
Fig. 3 is a perspective view of apparatus embodying my invention.
Figure 7:
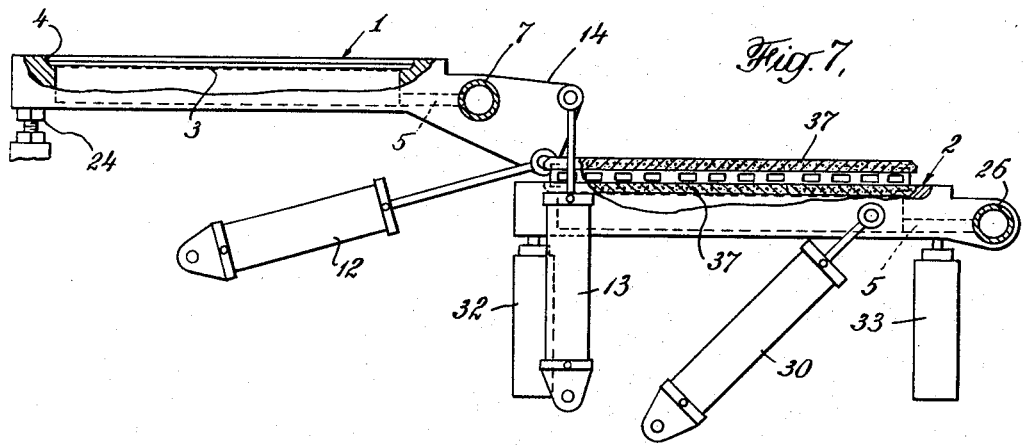
Figure 8:
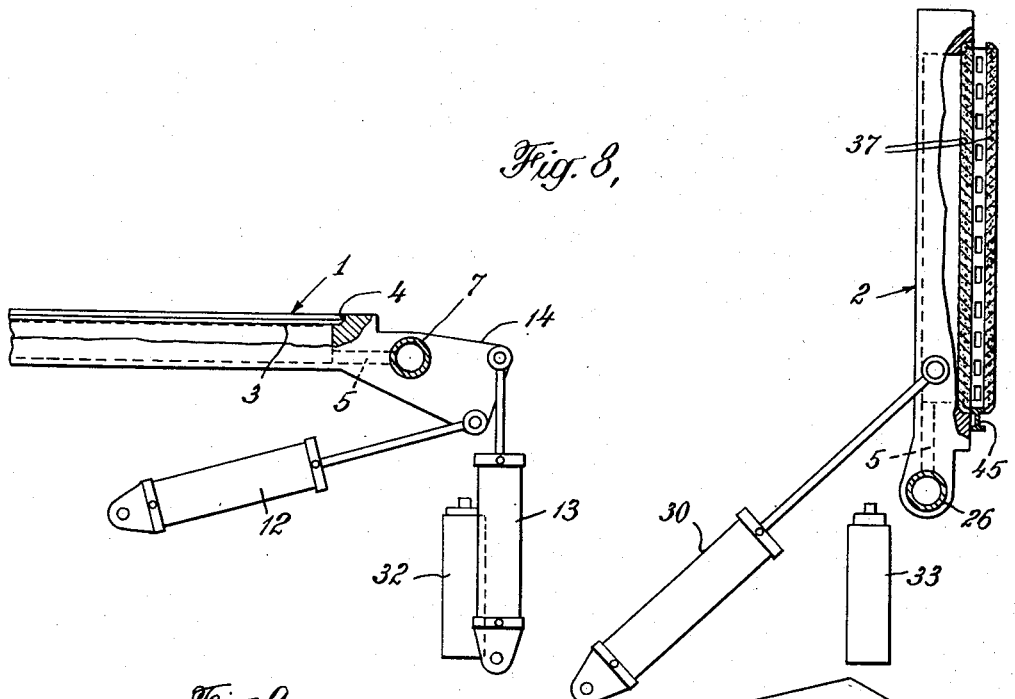
Figure 9:
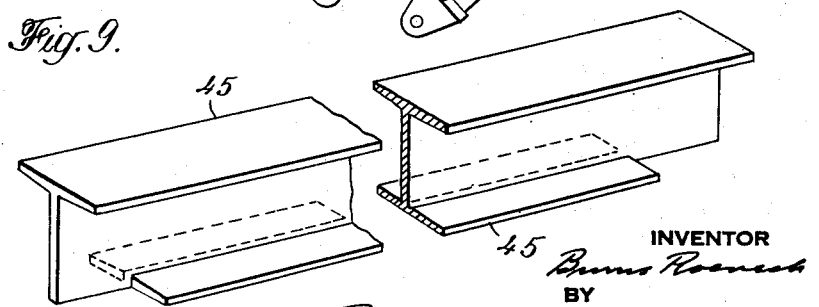

Figs. 4–8, inclusive, are diagrammatic views of the apparatus illustrated in Fig. 3 showing the series of operations performed in making a double wall panel in accordance with my invention; and Fig. 9 is an enlarged perspective view of a panel removing device.

Referring first to the apparatus as illustrated in Figs. 3–8, inclusive, I have shown in diagrammatic form a pair of complementary molds 1 and 2. Each mold has a bottom suction surface covered with one or more superimposed filter screens 3 and side walls 4. Ducts 5 and 6 communicate with the bottom of mold 1 and with a hollow tubular duct 7 connected to a vacuum pipe 8 leading to a vacuum pump (not illustrated).

The tubular duct 7 of mold 1 is rigidly connected to the framework 9 of the mold and the ends of this tube are journalled in bearings 10 and 11. Hydraulic cylinders 12 and 13 are connected to a crank member 14 fixed to the duct 7 and it will be understood that by controlling the supply of fluid to the hydraulic cylinders 12 and 13, the duct 7 and the mold 1 rigidly connected thereto can be rotated through approximately 180°, i. e., from the position shown in Fig. 3 to the position shown in 4-6, inclusive, where the mold 1 occupies a position directly above the mold 2. Corresponding hydraulic cylinders 15 and 16 connected to a crank member 17 fixed to the duct 7 at a point near the vacuum connection 8 may be operated in unison with the hydraulic cylinders 12 and 13 to rotate the mold 1 from one position to another as desired. The hydraulic cylinders 12 and 15 are carried by supports 18 and 19 and the cylinders 13 and 16 are connected by supports 20 and 21. Brackets 22 and 23 carry adjustable supporting studs 24 and 25 adapted to support the free end of the mold 1 when it occupies the position shown in Fig. 3.

The mold 2 is rigidly connected to a hollow tubular duct member 26 which communicates with the bottom of this mold through its ducts 5 and 6, and with vacuum connection 27. The duct 26 is journalled in vertical adjustable bearings 28 and 29 and hydraulic cylinders 30 and 31 can be operated in unison to rotate the mold 2 about the axis of the duct 26. Hydraulic lifting jacks 32, 33, 34 and 35 are provided to raise and lower the mold 2 in the manner and for the purpose hereinafter described.

In utilizing apparatus such as that shown in Figs. 3-8 of the accompanying drawings, a sheet of woven fabric 36 may be placed in the mold 1, this sheet of fabric being large enough to cover the bottom of the mold and to cover the side walls or edges 4 of the mold. This fabric 36 is preferably woven fabric such as cheesecloth, the fabric being preferably sized to make it somewhat stiff and free from wrinkles which might mar the appearance of the surface of the finished panel. The use of a cloth fabric is advantageous because of its characteristic of shrinking to some extent when wet, and accordingly any tendency of the fabric to form wrinkles is eliminated by the shrinking action which occurs when the wet concrete mixture is poured into the mold.

After the fabric 36 has been placed in the mold 1 as described above, a very wet mixture of cement aggregate and water is poured into this mold until it substantially fills the mold. This mass of concrete is shown at 37 in Figs. 3-8, inclusive. A typical concrete mixture found to be suitable for the purposes of this invention consists of coarse and fine foam slag aggregate in the proportions of one part by volume of coarse slag for each three parts of fine slag, and for each bag of cement (94 pounds) approximately 11½ gallons of water are used. For each 1.6 cu. ft. of cement I prefer to use approximately 8.2 cu. ft. of the mixture of coarse and fine foam slag. It will be understood that other concrete mixtures may be employed and that the proportions herein set forth are merely given as an illustrative example of a mixture found to be entirely satisfactory. This mixture contains more water than is ordinarily used in mixing concrete, but it is desirable to have a very wet mixture so that it readily fills the vacuum mold and so that it is soft enough to receive the metal reinforcing cage.

As soon as the batch of concrete is poured into the mold 1 as explained above, and leveled off in this mold, even with the top of the mold, the unitary reinforcing cage structure best illustrated in Figs. 1 and 2, is lowered into the mold until a portion of this cage is embedded in the soft mass of concrete. As illustrated in Figs. 1 and 2, this unitary metallic reinforcing cage consists of a rectangular frame comprising side studs 38 and 39 welded or otherwise rigidly fixed to end studs 40 and 41, and each face of this frame is covered by a wire mesh 42 welded or otherwise rigidly fixed to the side and end stud sections 38, 39, 40 and 41. The side and end studs are preferably metal channel sections having marginal flanges as shown at 43 in Fig. 1 connected by a web having cut out portions as best illustrated at 44 in Figs. 1 and 2.

After the metal cage has been lowered into the soft concrete mass in mold 1, the vacuum is applied to the bottom of this mold by opening a valve or valves in the vacuum line connecting the vacuum pump with the duct member 7 communicating with the channels 5 and 6. A vacuum of approximately 18 inches of mercury is applied for several minutes, during which time all excess water in the batch of concrete in the mold 1 is withdrawn through the fabric 36 and through the filter screen or screens 3 in the bottom of this mold and the concrete in this brief period of time, solidifies to such an extent that it forms a coherent body. As this vacuum treatment is continued, the mold 1 is rotated to an angle of approximately 90° to an upright position and while this operation is being performed, a second batch of concrete is poured into the mold 2, onto a layer of fabric 36 covering the bottom and side walls of this mold 2. The first mold 1 is then rotated further until the panel therein with the metal cage projecting therefrom is directly above the second mold as illustrated in Fig. 4. It will be understood that this inversion of mold 1 is accomplished by manipulating valves supplying fluid to the hydraulic cylinders 12, 13, 15 and 16, while continuing the application of the vacuum to the mold 1.

With the apparatus in the position illustrated in Fig. 4, the hydraulic jacks 32, 33, 34 and 35 are operated to lift the second mold 2 until the metal cage carried by the solidified panel in the first mold becomes partially embedded in the soft mass of concrete in the second mold, the position of the parts being then as illustrated in Fig. 5. The vacuum is then applied to the mass of concrete in the second mold until the excess water is withdrawn from this mass through the layer of fabric in this mold. While this vacuum treatment is being carried out and after the concrete 37 in the second mold has formed a coherent body, the hydraulic jacks 32, 33, 34 and 35 may be manipulated to lower the second mold, thus separating the molded panel body from the first mold section 1 as best illustrated in Fig. 6. The first mold section can then be rotated back to its initial position as illustrated in Fig. 7 and then, while continuing the vacuum treatment of the concrete in the second mold 2, this mold may be rotated into an upright position as best illustrated in Fig. 8. The vacuum may then be shut off and the finished panel may be lifted from the mold section 2 by any suitable mechanism engaging the metal stud elements, either at the ends of the panel or at the bottom edge of the panel, so that the lifting force is applied to the metal reinforcing cage. If desired, however, the second mold 2 may be completely inverted before the panel is separated therefrom, in which event the vacuum is continued until the complete inversion has taken place and the panel is brought to rest on a suitable support, at which time the mold 2 can be rotated back to its initial position, i. e., the position shown in Figs. 3-7, inclusive.

The removal of the finished panel from the mold 2 while this mold occupies an upright position as illustrated in Fig. 8, can be accomplished by placing an I-beam or the like 45 along the bottom of a panel and in contact with the metal reinforcing cage. With the panel thus supported along its bottom edge by this I-beam, the panel and mold can be separated from each other and the mold section 2 then rotated back into a horizontal position.

As stated above, satisfactory results can be obtained by employing a vacuum of approximately 18 inches of mercury. It is to be understood, however, that a vacuum ranging from approximately 8 inches of mercury to 24 inches of mercury may be employed as desired—the higher the vacuum the shorter the time required for withdrawing the excess water from the concrete.

It will also be understood that in some instances it may not be necessary to employ a reinforcing sheet of fabric or the like permanently embedded in one or both exposed surfaces of the precast panel and therefore according to one embodiment of our improved process, the fabric can be dispensed with and the panel formed by pouring the concrete directly onto the filter screen in the bottom of the mold, the subsequent operations then being performed as described above.

The improved building panel and process of making the same are claimed in copending application Ser. No. 745,332, filed May 1, 1947, by myself and Paul Brown.

It is to be understood that the subject matter to which the claims of the present application are directed is not

I claim:

1. Panel molding apparatus comprising a mold frame having side walls and a filter bottom, a tubular duct being fixed to said frame along one side wall thereof with ducts interconnecting the filter bottom and said tubular duct, means for applying a vacuum to said tubular duct, journal bearings for said tubular duct, and means for turning said frame about the axis of said tubular duct from a horizontal to a vertical position.

2. Panel molding apparatus comprising a mold frame having side walls and a filter bottom, a tubular duct being fixed to said frame along one side wall thereof with ducts interconnecting the filter bottom and said tubular duct, means for applying a vacuum to said tubular duct, journal bearings for said tubular duct, means for raising and lowering said frame and tubular duct while the frame remains horizontal, and means for turning said frame about the axis of said tubular duct from a horizontal to a vertical position.

3. Panel molding apparatus comprising a pair of mold frames each having side walls and a filter bottom, a pair of tubular ducts fixed to said frames along one side wall of each of the same, each of said frames having ducts interconnecting the filter bottom thereof with the tubular duct at one side thereof, means for applying a vacuum to said tubular ducts, journal bearings for said tubular ducts, means for turning one of said frames about the axis of the tubular duct fixed thereto, to invert the same over the other mold frame while continuing the application of the vacuum, and for turning said one frame back to its original position, and means for turning said other frame about the axis of the tubular duct fixed thereto, from a horizontal position to a vertical position.

4. Panel molding apparatus comprising a pair of mold frames each having side walls and a filter bottom, a pair of tubular ducts fixed to said frames along one side wall of each of the same, each of said frames having ducts interconnecting the filter bottom thereof with the tubular duct at one side thereof, means for applying a vacuum to said tubular ducts, journal bearings for said tubular ducts, means for turning one of said frames about the axis of the tubular duct fixed thereto, to invert the same over the other mold frame while continuing the application of the vacuum, and for turning said one frame back to its original position, means for raising and lowering said other frame while it remains horizontal, and means for turning said other frame about the axis of the tubular duct fixed thereto, from a horizontal position to a vertical position.

5. Panel molding apparatus comprising a mold frame having side walls and a filter bottom, a tubular duct being fixed to said frame along one side wall thereof with ducts interconnecting the filter bottom and said tubular duct, means for applying a vacuum to said tubular duct, journal bearings for said tubular duct, and means connected to each end of said tubular duct for turning said frame about the axis of said tubular duct from a horizontal to a vertical position.

6. Panel molding apparatus comprising a mold frame having side walls and a filter bottom, a tubular duct fixed to said frame along one side wall thereof with ducts interconnecting said filter bottom and said tubular ducts, means for applying a vacuum to said tubular duct, vertically adjustable journal bearings for said tubular duct, means for raising and lowering said frame and tubular duct while the frame remains horizontal, and means for turning said frame about the axis of said tubular duct, from a horizontal to a vertical position.

7. Panel molding apparatus comprising a pair of mold frames each having side walls and a filter bottom, a pair of tubular ducts fixed to said frames along one side wall of each of the same, each of said frames having ducts interconnecting the filter bottom thereof with the tubular duct at one side thereof, means for applying a vacuum to said tubular ducts, journal bearings for said tubular ducts, means for supporting one of said frames in a horizontal position whereby a batch of concrete may be poured into said frame mold and a reinforcing cage lowered into the concrete to partially embed the cage in the concrete, means for supporting the other mold frame in a horizontal position whereby a batch of concrete may be poured into the same, means for turning said one frame about the axis of the tubular duct fixed thereto, to invert the same over said other mold frame while continuing the application of vacuum to the tubular duct fixed to said one frame, means for bringing the mold frames together until said reinforcing cage is partially embedded in the concrete in said other frame, means for thereafter turning said one frame back to its original position, and means for then turning said other frame about the axis of the tubular duct fixed thereto, from a horizontal position to a vertical position.

References Cited in the file of this patent

UNITED STATES PATENTS

| | | |
|---|---|---|
| 2,175,715 | Denning | Oct. 10, 1939 |
| 2,305,684 | Foster | Dec. 22, 1942 |
| 2,421,584 | Terry | June 3, 1947 |